March 17, 1970 G. J. PETERSON 3,501,164
GROCERY CARTS

Filed Dec. 11, 1967 3 Sheets-Sheet 1

INVENTOR.
GARY J. PETERSON

BY John J. Leavitt

INVENTOR.
GARY J. PETERSON

March 17, 1970 G. J. PETERSON 3,501,164
GROCERY CARTS
Filed Dec. 11, 1967 3 Sheets-Sheet 3
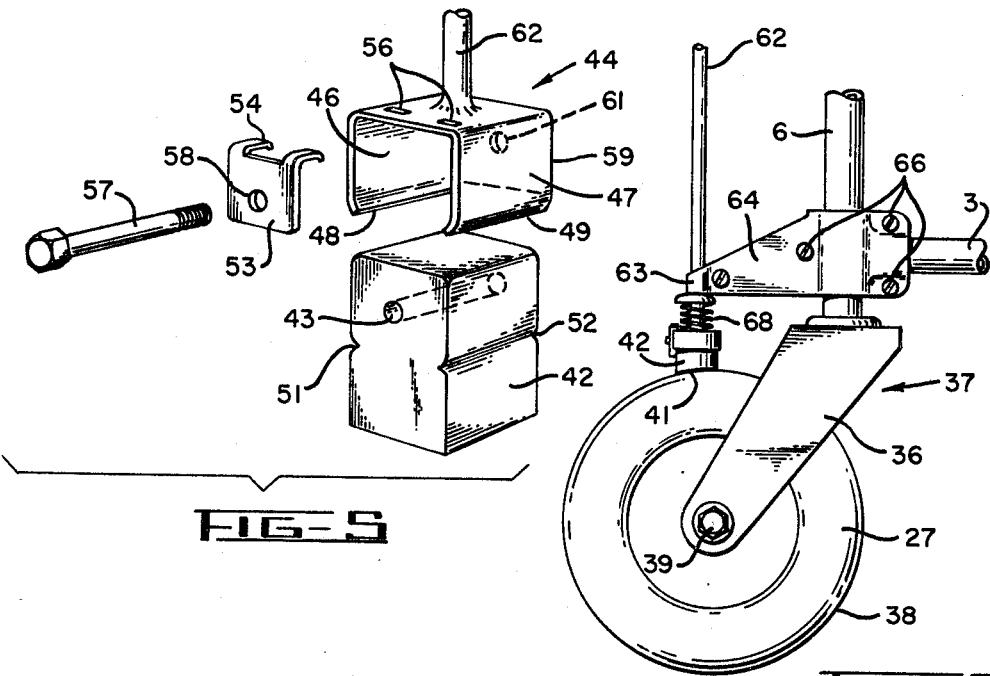
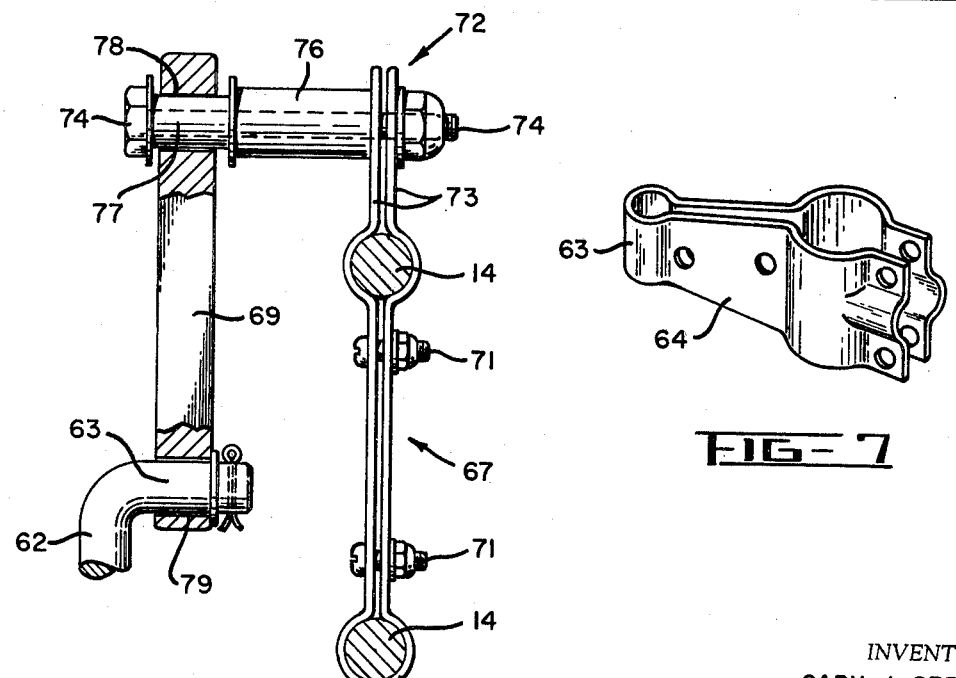
INVENTOR.
GARY J. PETERSON
BY John J. Leavitt

United States Patent Office 3,501,164
Patented Mar. 17, 1970

3,501,164
GROCERY CARTS
Gary J. Peterson, 923 E. El Camino, Space 20,
Sunnyvale, Calif. 94087
Filed Dec. 11, 1967, Ser. No. 689,643
Int. Cl. B62b 3/00, 5/04
U.S. Cl. 280—33.99                                    6 Claims

ABSTRACT OF THE DISCLOSURE

A brake mechanism for grocery carts is provided to prevent runaways where the grocery cart is used on an inclined surface such as a grocery store parking lot, and for permitting effective braking action while the grocery cart is being used within the store premises. Locking mechanisms or brake mechanisms for grocery carts should provide for manipulation of the brake mechanism by a shopper during the act of pushing the grocery cart, and should permit actuation by the checker when the grocery cart is presented at the checkout counter. Additionally, the brake mechanism functions when a multiplicity of the grocery carts are telescoped in train-like fashion as when the carts are collected on the parking lot and returned for use to the store premises.

BACKGROUND OF INVENTION

The advent of supermarkets with acres of parking lot surrounding the store has made it necessary that stores provide some means of carrying groceries between the store and customer's automobile. For this purpose, the grocery cart has evolved as a necessary adjunct to the operation of a supermarket or grocery store. In many cities supermarkets and grocery stores are constructed on hilly terrain, necessitating that large parking areas also be somewhat inclined with respect to the horizontal. Such large and inclined parking areas give rise to particular problems with respect to grocery carts in that the customer, attempting to manipulate the loaded grocery cart between parked automobiles, must constantly fight the tendency of gravity to draw the grocery cart downhill. In most cases such grocery carts are either not provided with brake mechanisms or the brake mechanisms that are provided do not function efficiently. It is therefore one of the important objects of the present invention to provide in conjunction with a grocery cart, a brake mechanism which will operate at the discretion of the customer under whose control the grocery cart is being utilized.

It is frequently the case that the people most prone to utilize grocery carts are elderly people, many of which may be afflicted with rheumatoid arthritis or other diseases which cause painful inflammation of the joints of the hand. Conventional brake mechanisms on grocery carts frequently require that the braking mechanism be operated by a hand-operated lever, which must be grasped by the fingers and digitally manipulated in order to effectively release or impose the brake mechanism. All grocery carts are conventionally provided with a push bar which is smooth in contour and which is easily grasped by the customer, or which is in position so that the customer may merely lean against the push bar in order to effectively propel the grocery cart. Accordingly, it is another important object of the invention to provide a brake operating mechanism in which an auxiliary actuating bar is mounted in conjunction with the conventional push bar and which may be easily grasped by arthritic fingers, or upon which an elderly person may lean in order to effect operation of the brake mechanism.

For maximum control of the grocery cart it is desirable that the grocery cart brake mechanism be effective automatically as soon as the control mechanism is released by the customer. Inasmuch as the grocery cart is manipulated or propelled from different ends depending on who is attempting to move the grocery cart, it is another important object of the invention to provide a brake control mechanism in conjunction with a grocery cart which may be manipulated from either end of the grocery cart. Thus, when a grocery cart is presented to the checkout counter for tabulation of the purchases, it is customary for the checkout clerk to grasp the forward end of the grocery cart and pull it into the space between the checkout counter and cash register. Conventional grocery carts, i.e., those without brake mechanisms, may be manipulated in this manner. However, with the mechanism forming the subject matter of this invention, release of the brake actuating mechanism by the customer would automatically lock the wheels, thus making it impossible for the grocery clerk to propel the grocery cart forward. Accordingly, it is the still further object of this invention to provide manipulating means on the forward end of the grocery cart which will enable the grocery clerk to release the brakes when he desires to pull the grocery cart into checkout position.

Since it is desirable that the brake mechanism be applied to impose a retarding force on the grocery cart as soon as the grocery cart has been released, it is clear that the entrainment of a multiplicity of carts would impose a problem because all of the brakes on all of the grocery carts would be imposing a braking force, thus making it impossible to compile the train of grocery carts. Accordingly, it is a still further object of the invention to provide a braking mechanism in conjunction with the grocery cart which is automatically released when one or more carts are telescoped or placed in entrained relationship.

The supermarket and super grocery store business has grown so prolific in late years that there are many hundreds of thousands of conventional grocery carts on the market and in use by the many grocery stores and supermarkets. Accordingly, it is another object of this invention to provide a brake mechanism in kit form which may be applied to existing grocery carts so as to provide such grocery carts with the facility of a brake mechanism which may be actuated by either the customer, the grocery clerk, or by telescopically related grocery carts.

The invention possesses other objects and features of advantage, some of which, with the foregoing, will be apparent from the following description and the drawings.

SUMMARY OF INVENTION

In terms of broad inclusion, the invention comprises a conventional grocery cart equipped with a pair of rear wheels and a pair of front wheels of the caster type which will turn in any direction. The four wheels are connected by an appropriate tubular frame, and the tubular frame in turn is connected by an upright member which terminates in an appropriately positioned push handle for the grocery cart. A basket of interlaced or welded rod members is supported on the wheel frame and on the push frame. Mounted on the grocery cart body, is a plate pivoted in such manner that various rods pivoted to the plate function as push rods in order to effect disengagement of the brake mechanism. Thus, manipulation of the brake mechanism release handle operated by the customer effects pivotal movement of the plate and disengagement of the brake. Also, pivotal movement of the handle grasped by the clerk when he pulls the cart into the space between the checkout counter and the cash register likewise effects pivotal movement of the plate so as to release the brake. Means are provided permitting one cart telescoped within another to effect release of the brake to permit entrainment of a multiplicity of carts such as when these carts must be gathered in a parking lot and returned to the store premises.

BRIEF DESCRIPTION OF DRAWINGS

FIG. 5 is a fragmentary exploded view in perspective of the brake shoe utilized in conjunction with a wheel in order to effect a braking action.

FIG. 6 is a fragmentary elevational view illustrating the brake shoe and wheel combination.

FIG. 7 is a detail view in perspective of the brake assembly clamp.

FIG. 8 is an enlarged fragmentary view, partly in elevation and partly in section, illustrating the pivot plate and clamp assembly.

DESCRIPTION OF PREFERRED EMBODIMENT

Figure 1:
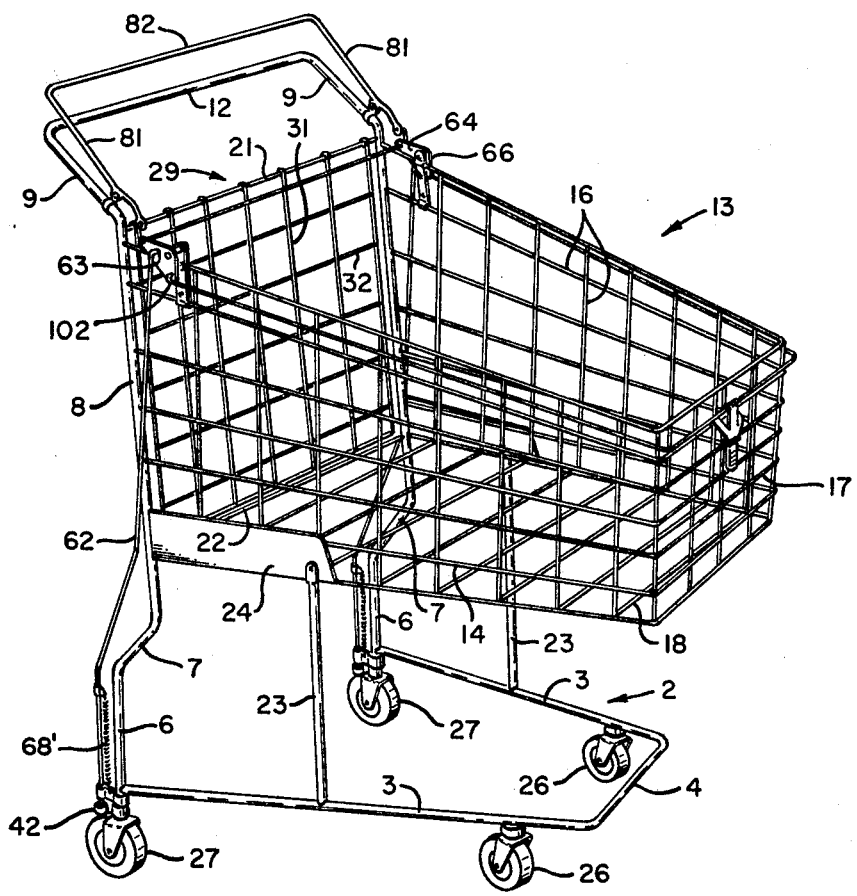
FIG. 1 is a perspective view of a grocery cart illustrating the brake mechanism in conjunction therewith.

In terms of greater detail, the grocery cart of my invention comprises a base frame designated generally by the numeral 2, and including left and right horizontal frame members 3, joined at their forward ends by a cross frame 4. At its free end each of the bars 3 is welded or otherwise rigidly secured to an upright member 6, also preferably of tubular construction, which extends upwardly to merge with a transverse and forwardly extending jogged portion 7 which in turn merges smoothly with an extension 8. Near its upper end, the extension 8, in each case, merges smoothly with a rearwardly and upwardly inclined handle portion 9, the two spaced handle portions 9 being joined at their free ends by a cross piece 12 forming a tubular continuation of the handle portions 9.

In order to carry groceries in the cart, the frame just described is utilized to support the forwardly extending basket designated generally by the numeral 13, having left and right sides 14 and 16, respectively, each of the side members being made up of horizontal and vertical bars spaced apart to form a grid-like sidewall closed at its forward end by a forward wall 17 of similar construction. A grid-like bottom wall 18 closes the bottom edges of sidewalls 14 and 16 and forward wall 17, and with these walls forms a container within which groceries may be stacked. The generally horizontal rod-like members making up each of the sidewalls 14 and 16 are integrally brazed or otherwise secured at their rear ends, or at their ends remote from the front wall 17, to the upright extensions 8 which are preferably spaced apart and rigidly retained in such spaced-apart position or relationship by a horizontal bar 21 the ends of which are brazed to the end portions of extensions 8 near their union with the rearwardly extending handle portion 9. Additionally, adjacent the end of each of the extensions 8 near the transverse and inclined section 7 of the tubular frame, a second transverse member 22 has its opposite ends rigidly brazed or otherwise secured to the upright extensions 8. Thus, it will be seen that the rods 21 and 22, being parallel to each other and essentially perpendicular to the upright extensions 8, cooperate with these extensions to form a rigid framework upon which the basket 13 may be supported.

In order to lend additional support to the basket, inasmuch as the forward end extends cantilever fashion forwardly from the frame members 8, a strut member 23 is interposed between each of the horizontal frame members 3 and the bottom rail of the grid-like bottom 18 of the basket. The strut is preferably positioned forwardly from the frame member 6-7-8 in order to provide, in effect, a four point suspension for the basket. If desired, a plate 24 may be brazed to the sidewall 14 and 16 and the strut member 23 brazed or otherwise secured to the plate.

In order to lend mobility to the grocery cart thus described, the lower frame 3-4 is provided with a pair of front wheels 26, each preferably being of the caster type which will move in whatever direction the grocery cart is propelled, and a pair of rear wheels 27, which are preferably of the type that do not caster.

In order to complete the enclosure of the basket 13, the rear or left end of the basket as viewed in FIG. 1 is preferably closed by a gate 29 having vertical and horizontal bar members 31 and 32, respectively, the upper ends 33 of the vertical bars 31 being formed with an eye journaled on the cross bar 21. The proportions of the gate and the position of the cross bar 22 permits the gate 29 to swing upwardly to the right as viewed in FIGS. 1 and 2, but prevents the gate from moving to the left past the position illustrated in these figures. Preferably, the sidewalls 14 and 16 of the grocery cart are convergent toward the front wall 17, with the proportions of the lower end of the gate 29 being such that when a second grocery cart is telescoped within the confines of the first cart, as viewed in FIG. 3, the gate 29 will lie in the position illustrated in FIG. 3, having been pushed into this position by the top rails of sides 14 and 16. This effect is achieved by tapering the gate 29 toward its lower end so that the length of the end bar on the gate at its lower end has a length proportional to the width of the basket at a point removed from the extension 8 equal to the depth of the gate.

The construction of the grocery cart described thus far is in all respects generally conventional and may be found in the grocery carts manufactured by many different companies. In order to apply to such basic or conventional grocery cart construction a brake mechanism which may be operated either by the customer as he pushes the grocery cart through the aisles of a supermarket, or which may be manipulated by a checkout clerk at the checkout counter, or which may automatically be activated or inactivated, as the case may be, by a clerk in telescoping two or more grocery carts, I have provided a brake mechanism or kit which may be applied to the conventional grocery cart, or which may be incorporated therein when the cart is originally manufactured. Inasmuch as it is desirable that grocery carts cease rolling as soon as the customers' hands have been removed from it, or when the grocery cart is otherwise released from human control, the mechanism is described in terms of its aspect when it is normally applied; i.e., the brakes are applied in order to impose a braking action on the rear wheels. With specific reference to FIG. 1, the brake mechanism in one of its aspects includes a brake shoe and wheel assembly illustrated best in FIG. 6, and including the rear wheel 27 journaled between the spaced and parallel and downwardly extending arms 36 of a U-shaped wheel bracket 37. The wheel bracket 37 is fixedly attached to the lower end of the upright member 6, below its union with the horizontal frame member 3. Preferably, as illustrated best in FIGS. 1 and 6, the arms 36 of the U-shaped bracket extend rearwardly so that a portion of the periphery 38 of the wheel 27 immediately above the pivot bolt 39 lies exposed for impingement by the bearing surface 41 of a rubber brake shoe 42. The brake shoe 42, best illustrated in FIG. 5, constitutes a generally rectangular block of rubber, preferably a neoprene type rubber, and is provided with a transverse bore 43 as shown. The brake shoe 42 is detachably mounted within a brake shoe bracket 44, having sidewalls 46 and 47, the lower edges 48 and 49 of which are bent inwardly toward each other somewhat in order to engage complementary grooves 51 and 52 formed in the sidewalls of the brake shoe 42. The brake shoe is locked to the bracket 44 by means of a clip 53 having bifurcated flanges or tangs 54 adapted to engage complementary apertures 56 formed in the bracket 44. With the tangs 54 engaged in apertures 56, it is clear that insertion of the bolt 57 through the aperture 58 in the bracket or clip 53 and through the aligned bore 43 will lock the brake shoe to the bracket 44. In order to insure that the brake shoe will not be dislodged, the bracket 44 is provided with the back wall 59 provided with a threaded bore 61 within which the bolt 57 is detachably secured. This bracket and brake shoe assembly is secured to an upwardly extending rod-like member 62 which at a point spaced above the bracket and brake shoe assembly passes through an enlarged section 63 of a bracket member 64 detachably secured to the upright frame member 6 by suitable screws 66. A forward portion of the bracket 64 encompasses the portion of horizontal frame member 3 next adjacent the upright member 6 and thus prevents rotary movement of the bracket 64 on the upright member 6. This brake assembly clamp is illustrated best in FIG. 7.

In order to retain the brake shoe 42 in continuous impingement against the surface 38 of wheel 27, a coil spring 68 is interposed in the space between the bracket 44 and the bracket 64. As shown in FIG. 6, the coil compression spring 68 exerts a downward force against the bracket 44, thus causing the brake shoe 42 to resiliently impinge against the top surface of the wheel 27. In another aspect, this construction may alternately be in the form illustrated in FIG. 1, where the spring 68' constitutes a coil spring under tension, with one end attached to the bracket 64 and its other end attached to the rod 62 above the bracket 64 as illustrated. Tension in the coil spring 68' thus tends to displace the rod 62 downwardly, bringing the brake shoe 42 into contact with the wheel 27.

Figure 2:
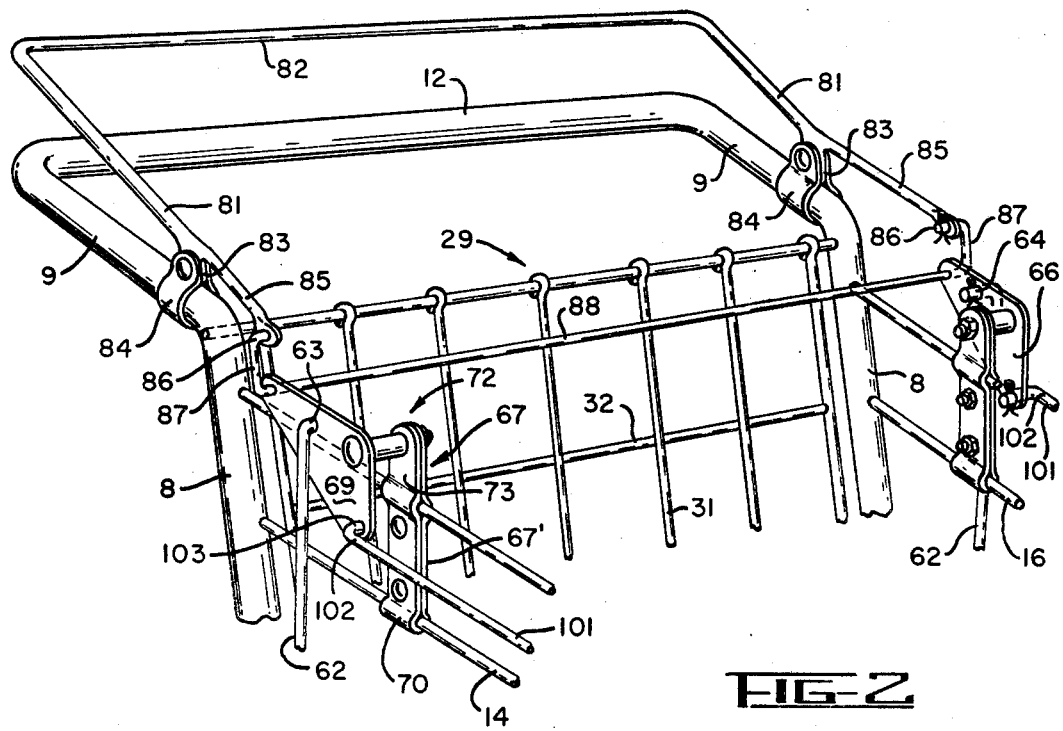
FIG. 2 is a perspective view in an enlarged scale illustrating the customer control handle, and its attachment to the pivot plate, and the attachment of the pivot plate to the grocery cart.
Figure 3:
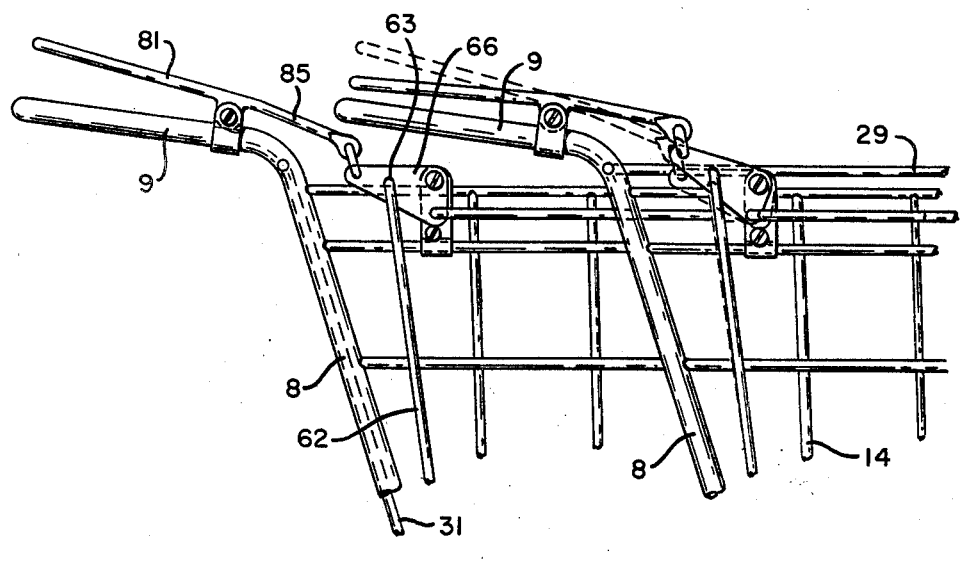
FIG. 3 is a side elevation illustrating portions of two grocery carts telescoped together to effect release of the brake mechanism of the forward cart.

As shown best in FIG. 1, the brake assembly just described is manipulated by means of mechanism which may be operated by a customer having control of the grocery cart, or by a grocery clerk utilizing means to pull the grocery cart into the checkout position. In addition, by means of mechanism hereinafter described, the locking mechanism just described may be rendered inoperative by telescoping one or more of the carts together. Thus, referring specifically to FIGS. 1, 2, 3 and 4, each of the brake rods 62 extends upwardly to a height immediately adjacent the upper rail of the side members 14 and 16. The upper end of each of the brake rods 62 is bent inwardly toward each other in mutually extending bearing portions 63 and 64. Each of these bearing portions 63 and 64 constitute stud shaft portions pivotally journaled in a pivot plate 69 having a configuration conforming generally to a 30–60–90-degree right triangle. The plate 69 is pivoted on the associated sidewall 14 and 16 by means of a pivot plate clamp assembly designated in FIG. 2 generally by the numeral 67 and including a strap-like member 67' doubled upon itself about a pair of the horizontally extending rod-like members forming the grid-like sidewall. As shown best in FIGS. 2 and 8, the strap-like member 67' is provided with a bight 70 at its lower end where it surrounds the horizontal sidewall rod, and is compressed inwardly to tightly engage the sidewall rod by appropriate bolts 71. Adjacent its upper end 72, the strap-like member again surrounds the associated horizontal sidewall rod and beyond the rod continues upwardly in a section 73 apertured to receive a bearing bolt 74. The bearing bolt is provided with a spacer 76 disposed between the strap-like member 73 and the pivot plate 69. The remaining portion 77 of the bolt 74 is appropriately journaled in an aperture 78 formed in the pivot plate 69. Preferably, as illustrated in FIGS. 2 and 3, the aperture 78 is formed in the corner forming the 90° angle of the pivot plate 69. The bearing or stud shaft portions 63 of brake rods 62 are journaled in appropriate apertures 79 formed in the pivot plate generally on a line extending between the pivot point 78 and the apex of the 30° angle formed by the plate. Thus, pivotal movement of the pivot plate 69 either clockwise or counterclockwise will result in longitudinal displacement of the brake rod 62. Such longitudinal displacement will have the effect of releasing or applying the brake shoe 42 with respect to the wheel 27.

Pivotal movement of the pivot plate 69 to release the brake assembly is effected by the customer through manipulation of a control lever or frame formed in a U-shape configuration, with each of the legs 81 joining a cross piece 82 which lies spaced above the handle portion 12. Referring to FIGS. 1, 2 and 3, the arms 81 of the generally U-shaped brake control lever are each provided with a downwardly extending lug 83 which is pivotally connected to a clevis member 84 in the form of a strap secured about the rearwardly extending handle portion 9 immediately adjacent its junction with the upwardly extending frame member 8. Suitable screws secure the arm members 81 to the clevises 84 and concomitantly provide a pivot for the arms 81. The forward portions 85 of arms 81 extend forwardly from lugs 83 and are flattened at their extreme ends and provided with apertures to receive the transversely extending stud shaft portion 86 formed on the upwardly extending crank arm 87 which in turn constitutes an integral extension of a cross rod 88. The cross rod 88 extends all the way across the basket, between opposing plates 69, and at each end, the cross rod 88 is pivotally journaled in an appropriate aperture formed in the pivot plate in the corner corresponding to the 30° angle of the pivot plate. Appropriate cotter keys as shown are utilized to retain the parts in operative position.

It will thus be seen that with downward pressure imposed on the cross member 82 of the brake-actuating mechanism by the hands of a customer, the forward extensions 85 of the brake-actuating mechanism will be caused to move upwardly, thus imposing a clockwise pivotal movement on the pivot plate 69, and tending to displace the brake rod 62 upwardly. Such upward displacement of the brake rod 62 will effect disengagement of the brake shoe 42 from wheel 27 and concomitantly will load the spring 68 (or 68') so that upon release of the brake-actuating cross member 82 by the customer the brake will automatically be reimposed.

As previously discussed, it is advantageous that when two or more of the grocery carts are telescoped, that the brakes be automatically disengaged in order to permit one man to manipulate a train including a multiplicity of the grocery carts. For this purpose, the cross rod 88 which is journaled on opposing pivot plates 69 is positioned with respect to the pivot point of cross bar 21 on which the gate 29 is pivoted so that upward pivotal movement of the gate 29, as by impingement by the forward end of a following grocery cart, will bring the vertical members 31 of the gate 29 into contact with the cross rod 88. Such upward movement of the gate 29 will have the effect of pivoting the pivot plate 69 clockwise, just as if a customer had imposed a downwardly directed force on the brake-actuating cross member 88. This relationship of the parts is clearly illustrated in FIG. 3 where the parts are shown in dash lines in the positions they would have prior to telescoping one cart into the other and in full lines in the position to which they have been adjusted by the action of gate 29 impinging against cross rod 88.

Figure 4:
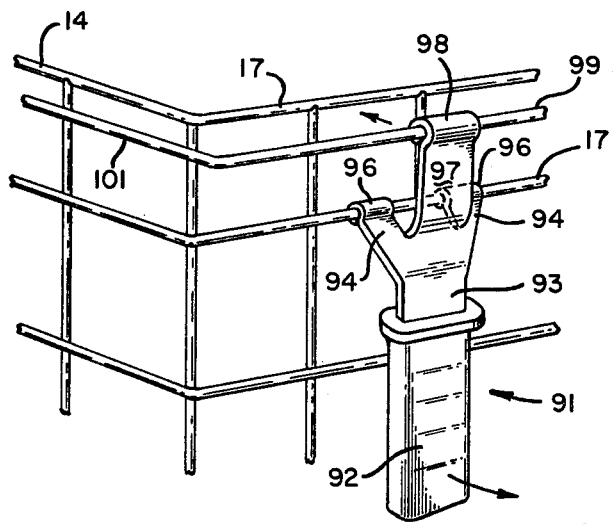
FIG. 4 is a fragmentary elevational view illustrating the handle on the forward end of the grocery cart which may be manipulated by the grocery clerk to release the brake mechanism and pull the grocery cart into checkout position.

In the normal use of a grocery cart, when all of the groceries have been selected, the customer normally pushes the grocery cart to within reach of the grocery clerk standing at the checkout counter. Experience has taught that the customer normally does not propel the grocery cart into the confined space between the checkout counter and the cash register, this action normally being taken by the grocery clerk when he is prepared to check out the next customer. However, with the brake system disclosed, inasmuch as a grocery cart that remains unattended by a customer cannot be moved because the brakes are normally imposed it is desirable that the grocery clerk be enabled to unlock the braking system and pull the grocery cart into checkout position. Accordingly a grocery cart of the invention, referring specifically to FIGS. 1 and 4, is provided with a handle designated generally by the numeral 91, having a hand grip portion 92 formed about a plate-like lever 93 having bifurcations 94 struck from the plane of the strap-like member 93 and provided with journal portions 96 curled about a horizontally extending member in the front wall 17 of the grocery cart. The proportions of the journal member 96 and the diameter of the horizontal front wall portion 17 are such as to permit free pivotal movement of the handle 91 on the horizontal front wall member. Extending from between the bifurcations 94 is a lever extension 97 formed with a journal portion 98 at its free end, pivotally engaging a horizontal cross rod 99 forming the connecting member between a pair of rearwardly extending brake rods 101 which range in parallel relation along opposite sidewalls 14 and 16 of the grocery cart basket. The rearmost end 102 of each of the brake rods 101 is provided with an inwardly extending stud shaft or bearing extension 103 journaled in the 60° corner of the pivot plate 69. Thus, as seen in FIGS. 2 and 3, pivotal movement of the handle 91 in the direction indicated by the arrow in FIG. 4 will effect a rearward movement or displacement of the cross rod 99 in the direction indicated by the arrow associated with that member, which in turn will effect a longitudinal and rearward displacement of the brake rods 101. Such rearward displacement of the brake rods 101 will in turn effect clockwise pivotal movement of the pivot plate 69, thus imposing tension on brake rods 62 and compressing spring 68 and 68' to release the brake shoe 42 from wheel 27. Appropriate cotter keys maintain the parts in operative position.

It will thus be seen that with the mechanism disclosed, the brake mechanism, although normally applied when a grocery cart is unattended, may be inactivated by any one of three different manipulations. Such versatility prevents grocery carts from running away on inclined surfaces, and gives the customer and the grocery clerk complete and versatile control over the movements of the grocery cart.

I claim:
1. In combination with a grocery cart including a frame rollably supported on wheels and a basket supported on the frame and having a forwardly projecting portion, a brake assembly comprising:
   (a) brake means associated with at least one of said wheels operative to normally impede rotation thereof;
   (b) and brake release means on the forwardly projecting portion of the basket selectively manipulable by a grocery clerk by pulling the brake release means in the direction in which he wants the cart to move to release the brake means to permit the grocery clerk to tow the grocery cart by the brake release means.
2. The combination according to claim 1, in which said brake means includes a brake plate pivotally mounted on the basket, a brake shoe normally impinging one of said wheels, a brake rod connecting the brake shoe and brake plate, and means connecting said brake release means with the brake plate to effect pivotal movement of the latter to effect release of the brake shoe from the wheel when the grocery clerk pulls the brake release means in the direction in which he wants the cart to move.
3. The combination according to claim 1, in which said grocery cart is provided with a handle portion to be grasped by a user, and brake release means are associated with said handle for operation by a downward pressure applied thereto and being operable independently of the brake release means on the forwardly projecting portion of the basket.
4. The combination according to claim 1, in which said grocery cart basket is provided with a gate pivotally mounted with respect to the sides of the basket to permit telescoping of the basket of one grocery cart into the basket of another, and brake release means supported on the basket and automatically actuated by pivotal movement of the gate to a full open position.
5. In combination with a grocery cart including a frame rollably supported on wheels and a basket supported on the frame and having a forwardly projecting portion, a brake assembly comprising:
   (a) brake means associated with at least one of said wheels operative to normally impede rotation thereof;
   (b) brake release means on the forwardly projecting portion of the basket selectively manipulable by a grocery clerk to release the brake means to permit towing movement of the grocery cart by the grocery clerk;
   (c) said brake means including a brake plate pivotally supported on the basket, a brake shoe normally impinging one of said wheels, a brake rod connecting the brake shoe and brake plate so that selective pivotal movement of the brake plate in a predetermined direction will effect disengagement of the brake shoe from the wheel;
   (d) second brake release means mounted on the grocery cart on the end thereof remote from the brake release means mounted on the forwardly projecting basket portion and automatically activated by telescoping one grocery cart into another; and
   (e) a third brake release means including a depressible handle mounted on the grocery cart in association with said second brake release means and manipulable by a customer by pressing downwardly on the depressible handle.
6. A brake assembly kit for grocery carts comprising a pivoted brake plate arranged to be detachably secured to a grocery cart, a brake shoe adapted for mounting in normally impinging relation to a wheel of a grocery cart, a brake rod connecting the brake shoe and pivoted brake plate whereby pivotal movement of the brake plate will effect movement of the brake shoe relative to the wheel, and linkage means connecting opposite ends of the pivoted brake plate to effect pivotal movement thereof from opposite ends of the grocery cart, said linkage means including a generally U-shaped horizontally oriented frame proportioned to circumscribe a forward portion of the grocery cart basket, the ends of the U-shaped frame pivotally engaging opposing pivoted brake plates, and a lever pivotally mounted on the U-shaped frame in position to effect longitudinal displacement of the U-shaped frame with respect to a grocery cart basket and pivotal movement of the pivoted brake plate when the lever is pivoted.

References Cited
UNITED STATES PATENTS
| | | | |
|---|---|---|---|
| 1,559,796 | 11/1925 | Shuey et al | 188—167 |
| 2,958,537 | 11/1960 | Young. | |
| 3,052,319 | 9/1962 | Swanson. | |
| 3,095,211 | 6/1963 | Altherr | 188—21 XR |

FOREIGN PATENTS
| | | |
|---|---|---|
| 1,487,464 | 5/1967 | France. |

OTHER REFERENCES
Netherlands application No. 6704514, published Oct. 2, 1967, Arnold et al.

LEO FRIAGLIA, Primary Examiner

MILTON L. SMITH, Assistant Examiner

U.S. Cl. X.R.

188—167, 29